United States Patent [19]

Clark

[11] 4,241,944
[45] Dec. 30, 1980

[54] EXPANSION JOINT

[75] Inventor: Norman E. Clark, Canandaigua, N.Y.

[73] Assignee: Garlock Inc., Longview, Tex.

[21] Appl. No.: 858,086

[22] Filed: Dec. 6, 1977

[51] Int. Cl.³ .............................................. F16L 51/02
[52] U.S. Cl. ..................................... 285/229; 285/423
[58] Field of Search ............... 285/229, 226, 149, 423, 285/235, 236; 138/124, 125, 126, 129; 156/174

[56] References Cited

U.S. PATENT DOCUMENTS

| | | | |
|---|---|---|---|
| 2,998,986 | 9/1961 | Buono | 285/229 |
| 3,051,512 | 8/1962 | Cranston | 285/229 X |
| 3,359,014 | 12/1969 | Clements | 285/229 X |
| 3,500,869 | 3/1970 | Skoggard et al. | 138/125 X |
| 3,552,776 | 1/1971 | Leymann | 285/229 X |
| 3,580,616 | 5/1971 | Merkwacz | 285/229 |
| 3,799,825 | 3/1974 | Champleboux et al. | 156/174 |
| 3,979,142 | 9/1976 | Fujisawa | 285/423 X |
| 4,023,834 | 5/1977 | Ewing | 285/235 |

FOREIGN PATENT DOCUMENTS

| | | | |
|---|---|---|---|
| 255125 | 10/1964 | Australia | 285/229 |
| 2278032 | 2/1976 | France | 285/229 |
| 1192496 | 5/1970 | United Kingdom | 285/226 |

Primary Examiner—Dave W. Arola
Attorney, Agent, or Firm—Woodcock, Washburn, Kurtz, Mackiewicz & Norris

[57] ABSTRACT

A high-pressure, high temperature expansion joint having superior physical characteristics and susceptible of economical manufacture. The joint comprises inner and outer covering layers of elastomeric material and a body which includes at least one layer of a bias-cut fabric and at least one outer supporting layer formed of a helically-wound strip of elastomeric material with a plurality of parallel reinforcing strands running longitudinally through the strip. The joint is formed in a shallow or flowing arch configuration which does not trap particulate materials in a fluid stream, and obviates the need for a filler piece.

16 Claims, 5 Drawing Figures

EXPANSION JOINT

BACKGROUND OF THE INVENTION

The present invention relates to bellows-type expansion joints, and more particularly to reinforced expansion joints which are adapted to couple lengths of rigid conduit together while allowing relative movement to occur.

While various types of resilient expansion joints have been known for years, such joints generally take one of two forms. One form, which will be termed the shallow or flowing arch type, has generally evolved for use in smaller-diameter applications wherein a uniformly resilient joint may be provided. Examples of shallow-arch joints are shown in U.S. Pat. Nos. 3,359,014—Clements and 3,552,776—Leymann. Joints or couplings of this type have a gradually enlarged section intermediate their ends which acts as a bellows to enable axial contraction or elongation of the joint, and moreover to accommodate angular and transverse misalignment of the ends. The body or carcass of the joint is generally of uniform construction, that is, the cross-sectional buildup or formation of the carcass is consistent from one end to the other. Shallow-arch joints are conventionally manufactured by a molding process which effectively limits their size due to the bulk and expense of the necessary molds.

In forming the reinforcing layer of flowing-arch expansion joints it is conventional to use a fabric which has been cut on a bias so that the warp and/or weft of the fabric extends at some angle to the axis of the joint. As set forth in U.S. Pat. No. 3,359,014 the preferred angle for such bias-cut layers is generally 45°. This provides both axial and radial support to the structure, yet allows the materials to be distorted sufficiently to be formed in the desired shape wherein the center of the material is distended to a larger diameter than the ends thereof, i.e. material is wrapped around a mandrel or mold core to form a bulged cylinder.

Owing to the deficiencies inherent in such a construction wherein flexure must take place over a large proportion of joint length, efforts have been made to add additional reinforcing structure. For instance, as in U.S. Pat. No. 3,359,014 a metal band may be placed about the joint at its center; or, as shown in U.S. Pat. No. 3,552,776 a reinforcing insert of metal or the like may be molded within the elastomeric body. While the shallow-arch type of expansion joint has the attributes of relatively low cost and weight in sizes up to approximately 20 inches in diameter, the relatively low strength factor and high tooling costs have prevented this design from becoming popular in large-diameter applications.

By far the most popular design of expansion joint for high pressure and/or high temperature applications is the so-called high arch design, as exemplified in U.S. Pat. Nos. 3,580,616 and 3,429,592—Merkwacz. The arch of this joint has substantially straight walls, and occupies only a relatively small, highly-defined portion of the total length of the joint. The walls of the arch are substantially perpendicular to the axis of the joint so as to form a sharp, narrow bellows in the joint. It has been found that the high arch joint lends itself to an extremely strong mode of construction, inasmuch as rigid reinforcing rings can be formed within the straight portions of the body or externally over the straight sections of the expansion joint on either side of the straight-walled arch. Although such reinforcement does not extend into the arch of the joint, due to the sizing and proportioning of the high, narrow arch a highly pressure-resistant joint can nonetheless be formed.

Although the so-called high arch expansion joint has been developed to a high degree, certain problems inhere in its construction and use. In order to achieve the required rigidity, the reinforcing rings in or over the body of the joint must be firmly and permanently located. Excess motion of the joint tends to break the internal rings free of the surrounding material, causing them to move or migrate within the carcass of the joint. Continued movement of this sort eventually results in destruction of surrounding material, and failure of the joint. As shown in U.S. Pat. No. 3,580,616 other methods of reinforcing the linear portions of the joint have been developed; generally, the approach is to surround as much of the joint as possible with an inextensible material which will prevent the joint from distending, and relegate any movement to the bellows or arch portion of the joint.

In order to overcome the inherent propensity of the high-arch joint to collect particulate material and sediment, a soft or sponge-like filler may be placed in the annular cavity formed by the arch. While this prevents the accumulation of particulate material it also inhibits movement of the joint, and commonly decreases the elongation, compression, and transverse distortion of the joint by 50%.

Attempts have been made to achieve the benefits of both types of joints in a single structure; for example, in U.S. Pat. Nos. 3,206,228 and 3,799,825 various types of supporting structures are shown which are intended to lend additional strength to expansion joints. U.S. Pat. No. 3,799,825 illustrates the prior art method of building up the carcass of an expansion joint wherein the fabric used to build up the carcass of the joint is cut on a bias such that the angle of the strands of the fabric is very high with respect to the axis of the joint. By using narrow lengths of material in which the strands run substantially crosswise, the strands are discontinuous and thus do not fully encircle the body of the joint. Since the strands only extend partway about the conduit a measure of expansion is possible through a stretching of the elastomer lying between adjacent sets of strands. As in the case of the above-described high-arch joint construction, reinforcement intermediate the arches can be provided by disposing helical metal ribbons upon the cylindrical walls of the assembly.

From the foregoing, it will be appreciated that it would be highly desirable to provide a large, high-pressure expansion joint which exhibits the strength of the high-arch expansion joint, but with the flexibility, low-weight and lack of particle entrapment which characterizes the flowing-arch style of joint.

It is therefore an object of the present invention to provide an expansion joint substantially as strong as conventional reinforced high-arch joints, without the presence of rigid rings imbedded therein or installed over the straight body sections.

Another object of the present invention is to provide an expansion joint which is substantially lighter than presently-available joints of equivalent pressure ratings.

Yet another object is to provide an expansion joint whose strength is comparable to a reinforced high-arch style of joint, but which does not entrap particulate material.

Yet another object is to provide an expansion joint of the low-arch configuration which will withstand internal pressures as well as a reinforced high-arch joint.

Yet another object is to provide a superior expansion joint which is substantially more economical to manufacture than prior-art joints of comparable pressure ratings.

Another object of the invention is to provide an expansion joint of the flowing arch configuration but which can be formed in large diameter sizes with or without the use of a mold.

Still another object is to provide a joint of the low-arch type which can be made in larger sizes than heretofore practical.

SUMMARY OF THE INVENTION

Briefly stated, in accordance with one aspect of the invention the foregoing objects are achieved by providing an expansion joint having opposing ends adapted to be received by opposed rigid conduits and a central section of substantially uniform construction, having inner and outer layers of elastomeric material, at least one layer of bias-cut fabric, and at least one reinforcing layer disposed about said bias-cut fabric and formed of a plurality of parallel strands wound helically and continuously over substantially the length of the expansion joint intermediate its ends. The strands are formed in an elongate strip of curable elastomeric material, and lie parallel one another so that as the strip is wound helically about the carcass no turns of any strand lie immediately adjacent one another.

In a preferred embodiment a plurality of layers is formed by helically winding such strips along the central portion of the carcass, succeeding layers being disposed at opposite laying angles.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

BRIEF DESCRIPTION OF A PREFERRED EMBODIMENT

Figure 1:
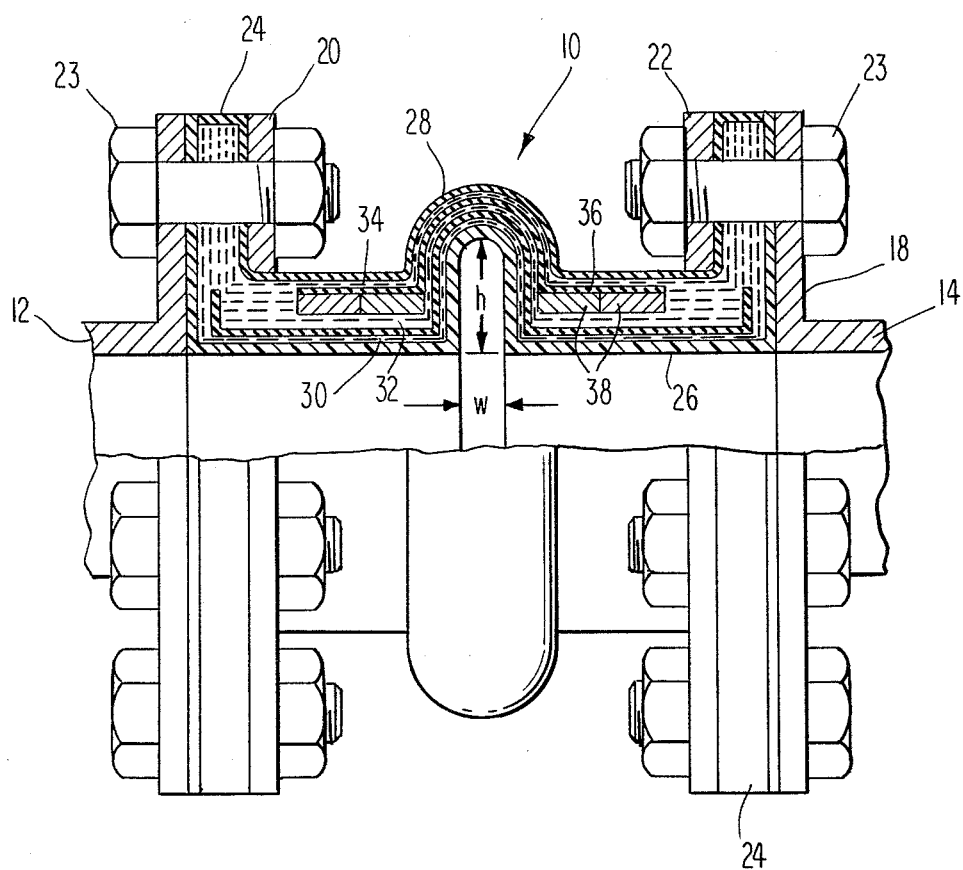
FIG. 1 is an illustration of a prior art expansion joint of the high-arch type.

Referring now to FIG. 1, there is shown a conventional expansion joint formed in the usual "high-arch" configuration. By a "high" arch is meant that the internal walls of the arch are substantially perpendicular to the axis of the joint, and the distance between them is small in comparison to the height of the arch itself. In FIG. 1 the height of the arch h is, for example, approximately three times its width w. Joints having this general configuration and proportioning are well known in the art, and are widely used for connecting tubes, ducts and pipes in a wide variety of applications. The principal use of such couplings, however, is in joining conduits carrying pressurized hot, cold and/or corrosive fluids. The flange-to-flange dimensions, flange diameters, and bore diameters of the joints have in fact become standardized so that for any given pipe diameter there is a corresponding, standard expansion joint length.

The joint is fitted between a pair of confronting conduits 12, 14 which are provided with flanges 16 and 18, respectively. Rings 20, 22 are coupled to the conduit flanges by threaded bolts 23 and serve to encapture the end flanges 24 of the expansion joint.

Joint 10 is provided with an inner layer 26 and an outer layer 28 of a suitable elastomeric material. Various kinds of rubber or rubber-like materials may be selected, depending upon the temperatures and materials to be encountered during service. The body or carcass of the joint comprises a plurality of layers 30, 32, 34 of impregnated fabric. The fabric is usually a textile material which is impregnated with a curable elastomer. In addition, layers of elastomer such as rubber 36 may be disposed intermediate the fabric layers.

In order to prevent expansion or "ballooning" of the joint between its end flanges and the expansion arch portion thereof, rigid metal rings 38 are conventionally disposed between the various layers of the joint carcass during its construction. The purpose of the rings is principally to provide radial support to the joint, so that most if not all of the joint movement or flexure will take place in the annular expansion arch at the center thereof. Because the arch must remain flexible, and also due to its curvature, it has been found prohibitively difficult to provide sufficient reinforcement to allow the arch to exhibit the same strength as the other portions of the joint carcass. In fact, and as set forth in U.S. Pat. No. 3,429,592 when failures do occur in expansion joints of the type shown in FIG. 1 they almost always occur at or about the expansion arch. Some failures are due to the inherent relative weakness of the expansion arch portion of the structure, while others are attributed to shifting or movement of the metal reinforcing rings, which chafes or leaves a void in the internal structure of the carcass. Aside from this the presence of the large, heavy metal rings within the carcass adds considerable weight, making the carcass more difficult to handle and to support.

When high-arch expansion joints ar used to couple conduits through which slurries pass it has been found that sediment or other particulate material tends to collect in the narrow expansion arches, inasmuch as they are removed from the fluid flow stream and act as "pockets" in which such material can collect. The buildup of such material within the arches prevents or severely inhibits the axial compression of the joint, and further inhibits both transverse and angular deflection. In an attempt to overcome this problem manufacturers have inserted fillers of spongy material into the interior of the arch, thereby presenting a generally continuous, tubular surface to the liquids flowing through the joint but at the cost of halving the compressibility, elongation and deflectability of the joint.

While expansion joints of the type shown in FIG. 1 are commercially available and conventionally used in sizes up to 122" in diameter such expansion joints are fabricated, by which term is meant that the individual layers or plies are formed one by one upon an appropriate mandrel or other form, and the finished, composite joint is then cured at a high temperature to fuse and solidify the various components. Due to this method of construction, which is almost universally used for couplings over 12" in diameter the makeup of the joint must be such as to lend itself to fabrication, which is commonly by hand. Accordingly, the design of the joint must be such as to allow it to be built up, layer by layer, and maintain its structural integrity while it is undergoing a baking or vulcanizing operation in an oven or the like.

Figure 2:
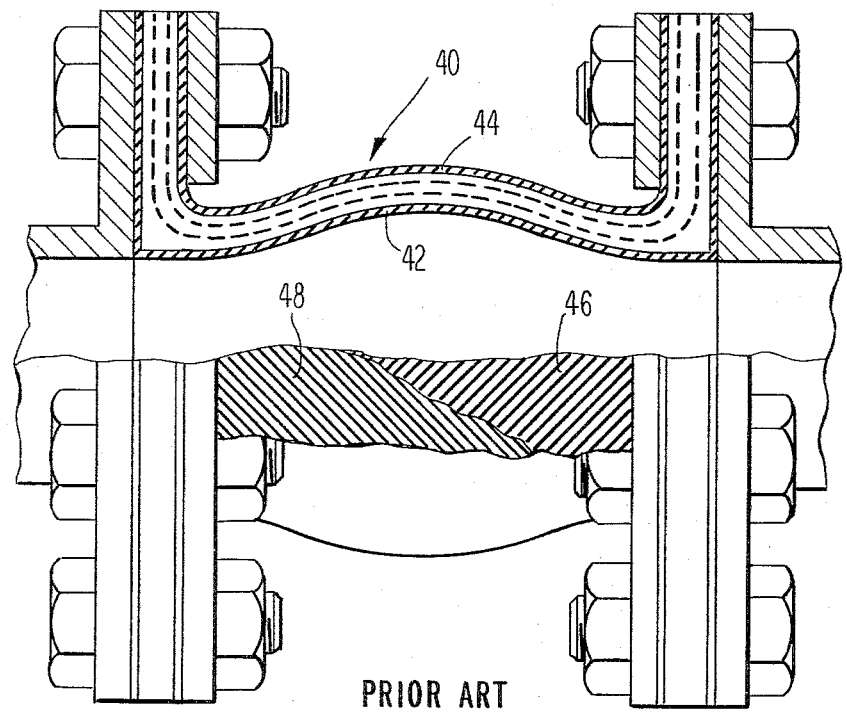
FIG. 2 represents a cutaway view of a prior art expansion joint of the low-arch variety.

In FIG. 2 there is shown another type of coupling device 40, commonly referred to as a pipe coupling or pipe connector. While the connector of FIG. 2 serves the same general purpose as the expansion joint of FIG. 1, i.e. to provide a compressible, somewhat resilient intermediate member between two rigid conduits, such connectors generally do not display the rigidity of the expansion joints of the type shown in FIG. 1. One advantage of the connector of FIG. 2 is the relatively low expansion arch, which may extend substantially over the length of the connector intermediate its flanges. Connectors of the type shown in FIG. 2 are conventionally molded and not provided with rigid, internal supporting members analogous to rings 38 of the joint of FIG. 1. Connector 40 is therefore resilient over its entire length, and includes inner layer 42 and outer layer 44 of an elastomer similar to that used in the joint of FIG. 1. Intermediate the inner and outer layers there may be provided one or more layers of fabric or other flexible reinforcing material. In FIG. 2 two such layers are present; an inner layer 46 and an outer layer 48. Such layers are commonly formed of single sheets of material cut on a bias such that the warp or woof of the fabric lies at an angle, termed a "laying angle," of approximately 45° to the axis of the connector. Fabrics selected for use may include fabrics impregnated with rubber or similar, resilient material. The reinforcing fabric is stretched over a form, commonly the inner member of a mold, to cover the generally spherical surface thereof. In this manner, the reinforcing fabric must be able to stretch in at least one and preferably two directions in order to allow it to be formed into the proper contour. The connector carcass, including the inner and outer coverings and the internal reinforcing fabric, is then enclosed in a mold and heated to an appropriate temperature, wherein the elastomeric materials flow together and fuse to form an elastic connector body. The connector is then cooled and when it is solidified it is removed from the mold.

Owing to production difficulties and the inordinate expense involved, rarely if ever have connectors of the type shown in FIG. 2 been made in sizes over 20" in diameter. The construction of molds for connectors larger than this becomes inordinately expensive, yet is necessary due to the non-self sustaining construction of the raw connector carcass, which requires the presence of an enclosing mold to support it when it is heated to the requisite temperatures. Still further, it has been found that for connectors larger than 20" in diameter the larger axial dimension causes "ballooning," or undue lateral expansion, of the connector. Apparently connectors which are relatively short, i.e. less than approximately 8" flange-to-flange, have sufficient strength to withstand the pressures encountered. As the connectors are made longer and longer, however, they are unable to sustain the same high pressures. While attempts have been made to overcome this deficiency by surrounding a portion of the connector with metal bands and the like, to date no joints of this type have been successfully commercially produced for conduits over 20" in diameter.

Figure 3:
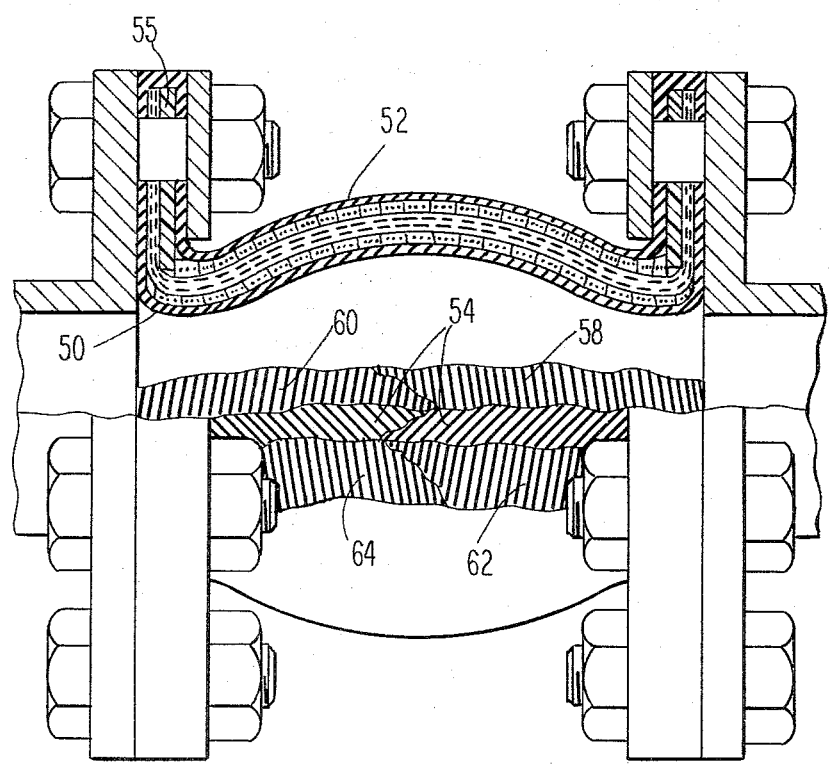
FIG. 3 illustrates, in cutaway form, the novel joint construction of the present invention.

The applicant's invention serves to overcome the foregoing deficiencies. As disclosed in FIG. 3, an expansion joint formed according to applicant's invention includes inner and outer layers 50, 52 of an elastomer such as neoprene, chlorobutyl rubber, or the like. One or more body plies 54 are formed about the center of the structure, and advantageously extend into the flanges thereof. In addition, one or more flange fillers 55 may be provided and formed from a synthetic fabric material, such as polyester.

On either side of body plies 54 are reinforcing layers 58, 60, 62 and 64. The latter are formed from long strips of elastomeric material in which are embedded two or more parallel strands of reinforcing cord. Strands of various reinforcement materials suitable for use in vehicle tires, and known in the industry as tire cord, have been found eminently suitable for this application. Accordingly, various strand-like materials available under diverse proprietary names may be used, as well as strands of glass fiber and the like.

By making the strips used to form layers 58, 60, 62 and 64 very narrow in relation to the flange-to-flange dimension of the carcass, for instance approximately 1/15th of the flange-to-flange distance, it has been found that the strips can be wound about the carcass in an abutting relationship while still following the contour of the flowing arch of the carcass. It is preferred, and in all likelihood necessary, that one continuous strip be used for each reinforcing layer so that the tire cords in the layer describe a continuous helix over the entire length of the carcass. Further, inasmuch as each strip has at least two cords disposed in side by side fashion within it, at no time will succeeding turns of a cord lie adjacent one another; by definition, the turns of each cord will be interspersed with turns from the other cords in the strip. Still further, it is necessary that the width of each body ply strip be greater than the thickness thereof, so that each strip gives the appearance of a relatively thin, flat length of material, suggestive of a tape.

The angle which each tape makes with the axis of the carcass is much higher than the angle of the warp or weft strands of a conventional bias-cut fabric layer. In a preferred embodiment this angle, termed the laying angle, is 80° or greater. It will be recognized, however, that this angle can be varied depending upon the particular application, and the dimensions and proportioning of the carcass to which it is applied. Preferably succeeding strips lie at opposite angles, as shown.

Table I sets forth various critical characteristics of expansion joints, and in particular allows a comparison of such aspects between those of commercially-produced embodiments of the present invention, and comparable filled prior art expansion joints. It is significant to compare characteristic values for the present invention and for prior art expansion joints which are filled to prevent entrapment of particulate matter. As stated above, due to the relatively shallow arch of the inventive joint, fluid flow continuously traverses the surface of the arch, preventing a buildup of particulate matter; hence, in reference to its particulate-entrapment characteristics, the inventive embodiment fulfills the functions of the prior-art filled arch design. Inasmuch as the filling of the arch of prior art joints diminishes their compression and elongation, and transverse deflection by a factor of 50%, it will be seen that the present embodiment exhibits a far superior degree of compression, elongation and transverse deflection. In other words, for a given pressure resisting capability joints formed in accordance with the present invention are far more flexible and resilient than those of comparable prior art expansion joints with filled arches.

One slight deficiency of the referred-to commercial embodiments is a lessened capability of withstanding vacuum, typically being able to withstand a vacuum of 10–15" of mercury, as compared to conventional couplings which will withstand 30". Accordingly, for those applications in which high vacuum conditions are expected it is anticipated that conventional expansion joints reinforced with solid metal rings will be selected.

TABLE I

| Dia. | | Comp. | Elong. | Trans. Defl. | Press. | Vac. | Approx. Weight |
|---|---|---|---|---|---|---|---|
| 10" | (a) | 1 | 3/8 | 1/4 | 190 | 15" | 13 lbs. |
|  | (b) | 3/8 | 3/16 | 1/4 | 190 | 30" | 23½ lbs. |
| 16" | (a) | 1 | 3/8 | 1/4 | 110 | 15" | 22 lbs. |
|  | (b) | 3/8 | 3/16 | 1/4 | 110 | 30" | 48 lbs. |
| 20" | (a) | 1⅛ | 7/16 | 1/4 | 110 | 15" | 27 lbs. |
|  | (b) | 7/16 | 7/32 | 1/4 | 110 | 30" | 55 lbs. |
| 30" | (a) | 1⅛ | 1/2 | 1/4 | 90 | 12" | — |
|  | (b) | 1/2 | 1/4 | 1/4 | 90 | 30" |  |
| 40" | (a) | 1⅛ | 1/2 | 1/4 | 90 | 12" | 100 lbs. |
|  | (b) | 1/2 | 1/4 | 1/4 | 90 | 30" | 200 lbs. |
| 68" | (a) | 1⅞ | 1/2 | 1/4 | 70 | 10" | — |
|  | (b) | 9/16 | 1/2 | 1/4 | 70 | 30" |  |

(a) denotes commercial embodiments of invention
(b) denotes prior art expansion joints with filled arches, and designed for high pressure rating.

A highly significant advantage of joints formed in accordance with the present invention is their substantially lighter weight. Experience to date indicates that expansion joints constructed in accordance with the teachings of the present invention are generally one half the weight of comparable prior art joints. The substantial reduction in weight is principally attributable to the elimination of rigid metal support rings of the type shown at 38 of FIG. 1. Instead, the present invention utilizes one or more layers of helically-wound body ply strips to obtain the needed circumferential support while providing increased flexibility.

Figure 4:
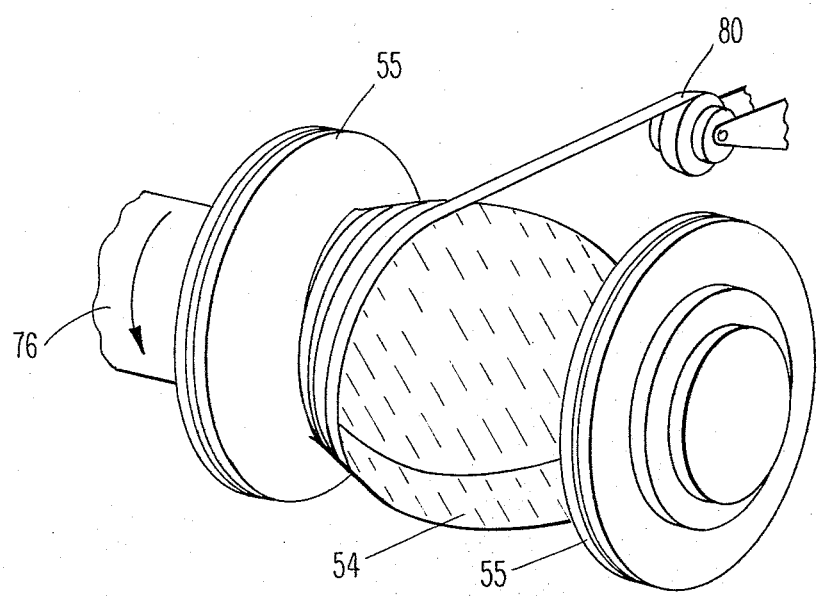
FIG. 4 shows one manner of constructing the joint of FIG. 3.

FIG. 4 illustrates one manner of constructing the inventive expansion joint. The innermost body materials are applied, layer by layer, to a form supported on a rotatable mandrel 76. One or more bias-cut body plies 54 are wrapped about the joint carcass. Disk-shaped flange fillers 55 are placed upon the carcass, lending strength and rigidity to the end flanges structure.

Figure 5:
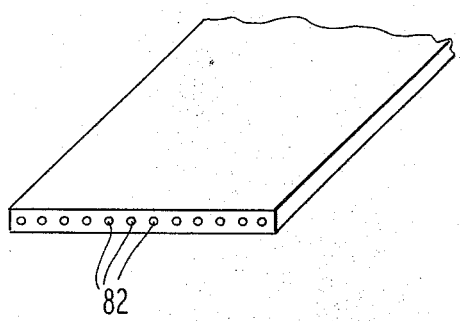
FIG. 5 is an enlarged illustration of a member used in forming the inventive expansion joint.

A body ply strip of the appropriate length is wound into a roll 80. The strips are flat and relatively thin, and typically exhibit a width of ⅜" to ½" for expansion joints having diameters in the range of 12" to 20". Of crucial importance is the fact that each body ply strip comprises parallel strands of high-tensile strength material, e.g. tire cord, which extend throughout the length of each strip. As shown in FIG. 5, the thickness of the body ply strip is much less than the width thereof. In one successfully tested embodiment body ply strips having width of 9/16" and a thickness of approximately 1/32" were utilized. The matrix surrounding the parallel cords 82 was formed of a curable rubber-like elastomer, and the cords closely aligned together and spaced to provide approximately 28 cords per inch width of body ply material.

As set forth above, of critical importance is the fact that the strands extending through the body ply strip are parallel to one another, but free of each other; in other words, the cords do not form a fabric, but are aligned and held in position with respect to one another in the matrix of the curable elastomer. Also of critical importance is the fact that the thickness of the ply strips is considerably less than the width thereof, thereby forming a flexible tape which will conform to the curvature of the surface of the expansion joint carcass. Inasmuch as the strands 82 are not physically linked together except for being disposed in the same, flexible matrix, the strips have sufficient lateral flexibility so that they may be stretched over a curved or crowned surface and will conform closely to it. At the same time the strips are practically longitudinally inextensible, precluding bulging or ballooning of the expansion joint when it is subjected to high pressures.

Further in the preferred embodiment the body ply strip is wound about the expansion joint carcass so that each turn of the strip is immediately adjacent the previous turn. This configuration, termed a butt-lap configuration, produces a substantially smooth layer of material. Owing to the high laying angle of the cords within the body ply strip a high degree of circumferential support is provided. Such support cannot be achieved by wrapping the carcass with a sheet of material, no matter how many layers are provided. At the same time, the thin strips are capable of conforming to the compound curvature of the surface of the built-up expansion joint carcass. Since the thin, narrow body ply strips conform to even rapidly-rising arches, successive turns do not have a tendency to roll back upon previously-wound turns, as would be the case if individual strands were used rather than flat strips.

As will be evident from the foregoing description, certain aspects of the invention are not limited to the particular details of the examples illustrated, and it is therefore contemplated that other modifications or applications will occur to those skilled in the art. For example rather than using physically separate strands in the body ply strips a suitable fabric having warp and woof may be used as long as the nature of the fabric allows the strands sufficient independent movement so that they can conform to the contour of the joint, and substantially equalize the tension between them. Further, it should be apparent that the present construction lends itself to flangeless as well as flanged couplings. Couplings having flangeless ends are well known in the art, one example of flangeless construction being illustrated in U.S. Pat. No. 3,552,776—Leymann. It is accordingly intended that the appended claims shall cover all such modifications and applications as do not depart from the true spirit and scope of the invention.

What is claimed is:

1. A flexible expansion joint adapted to be secured between a pair of substantially rigid conduits and including first and second ends adapted to be received in sealing relationship with ones of said conduits and having an enlarged central section forming an arch, the walls of said arch extending radially at substantially less than 90° to the axis of the joint, the portion of said joint lying between said ends comprising an inner wall and an outer wall of elastomeric material, at least one support layer positioned intermediate said inner and outer walls and extending over the entire length of said joint between said first and second ends formed by a sheet of fabric oriented at a bias with respect to the axis of said joint, and at least one reinforcing layer positioned intermediate said inner and outer layers comprising a plurality of strands extending helically and continuously over substantially the entire length of the joint intermediate the ends thereof, such that no turns of any of said strands are disposed immediately adjacent other turns of the same strand.

2. An expansion joint according to claim 1, wherein said strands are substantially evenly distributed over the length of said joint.

3. An expansion joint according to claim 1, wherein said strands are disposed in a plurality of layers within said joint.

4. An expansion joint according to claim 1, wherein said plurality of strands describes at least four turns disposed helically about said joint.

5. An expansion joint according to claim 1, wherein said strands are disposed at a laying angle substantially greater than 45° with respect to the axis of said joint.

6. An expansion joint according to claim 5, wherein said strands are disposed at an angle of substantially 80° with respect to the axis of said joint.

7. A flexible expansion joint for resiliently coupling a pair of substantially rigid conduits, including first and second ends adapted to be affixed in sealing relationship to the ends of the conduits and having an enlarged central section intermediate said ends defining an arch, said arch having walls extending radially at substantially less than 90° to the axis of the joint, the entire length of said joint being of substantially uniform construction between said first and second ends and comprising:
   an inner wall;
   an outer wall;
   at least one support layer comprising a sheet of fabric wrapped about the axis of said joint; and
   at least one reinforcing layer formed by the process of providing at least one elongate body ply strip comprising at least two continuous strands extending generally parallel to one another throughout the length of the strip, said strands being substantially encased in a curable elastomer matrix, said strip having a width greater than the thickness thereof; and
   winding said strip helically over substantially the full length of said joint between the ends thereof to form a plurality of turns of said strip.

8. An expansion joint according to claim 7, wherein the width of said body ply strip is at least twice the thickness thereof.

9. An expansion joint according to claim 8, further including a first intermediate layer of fabric disposed radially within said reinforcing layer, said fabric comprising a sheet oriented at a bias with respect to the axis of said expansion joint.

10. An expansion joint according to claim 8, wherein said body ply strip is substantially evenly distributed along the length of said joint intermediate the ends thereof.

11. An expansion joint according to claim 9, wherein said body ply strip is helically wound in a butt lap configuration.

12. An expansion joint according to claim 7, wherein said strands are formed of tire cord.

13. A flexible expansion joint for resiliently coupling a pair of rigid conduits and having a pair of opposed ends adapted to be coupled to the ends of ones of the conduits and further having an enlarged central section intermediate the ends defining a low arch such that the walls of said arch extend radially at substantially less than 90° to the axis of said expansion joint, said central section comprising:
   an innermost layer of elastomeric material;
   at least one intermediate fabric support layer surrounding said innermost layer and comprising a sheet of fabric oriented on a bias with respect to the axis of said expansion joint; and
   at least one reinforcing layer surrounding said intermediate layer, both said support and said reinforcing layers extending substantially entirely between the ends of the joint, and said at least one reinforcing layer comprising a body ply strip formed of a plurality of parallel strands of high tensile strength material oriented in substantially a common plane and encased in an elastomeric matrix to form a tape-like structure, said body ply strip being helically wound about said intermediate fabric layer so that said strands lie at an engle substantially greater than 45° with respect to the axis of said joint.

14. An expansion joint according to claim 13, wherein said strands of succeeding reinforcing layers are helically wound in opposite directions.

15. An expansion joint according to claim 13, wherein said ends comprise outwardly-extending, generally parallel flanges.

16. An expansion joint according to claim 13, wherein said strands are formed of tire cord.

* * * * *